Patented Apr. 16, 1929.

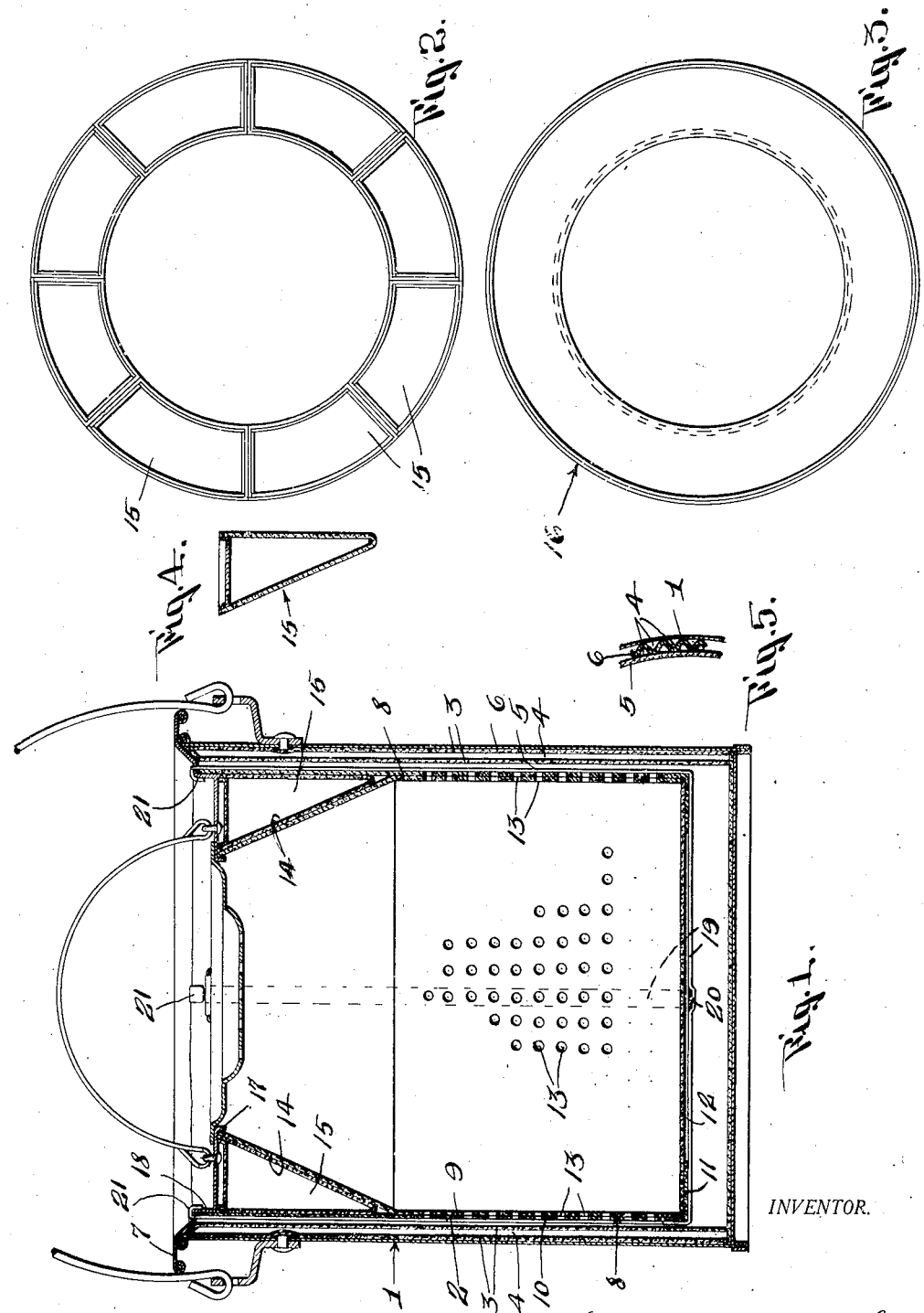

1,709,424

UNITED STATES PATENT OFFICE.

LUDWIG ALVINE ZOHE, OF SYRACUSE, NEW YORK, ASSIGNOR TO MILLARD R. AMES, OF SYRACUSE, NEW YORK.

MINNOW PAIL.

Application filed September 9, 1927. Serial No. 218,468.

My invention consists of a minnow bucket of the floating type and has for its object a particularly simple and inexpensive construction which is highly efficient and durable in use and wherein the float chamber consists of a plurality of removably inclosed waterproofed air cells of paper or other suitable material. Other objects will appear throughout the specification.

The invention consists in the novel features and in the combinations and constructions hereinafter set forth and claimed.

In describing this invention, reference is had to the accompanying drawing in which like characters designate corresponding parts in all the views.

Figure 1 is a longitudinal sectional view of my minnow pail.

Figure 2 is a plan view of the air cells or float.

Figure 3 is a plan view of a modified form of air cell or float.

Figure 4 is a longitudinal sectional view of one of the air cells shown in Figure 2.

Figure 5 is a fragmentary sectional view of the walls of the outer receptacle shown in Figure 1.

Heretofore, minnow pails or buckets have been made of metal and the single inner receptacle or float has been made of metal and the joints soldered to make an air tight cell or float chamber. Obviously, it is rather difficult and expensive to produce a float that does not leak and with the rough handling to which minnow pails are subjected, the joints soon leak and the float chamber is destroyed.

It has also been found that the acids from the soldered joints, the minnows coming in contact with the metal of the pail and the fact that a metal pail allows the water therein to attain a very high temperature especially in warm climates, tends to kill the minnows.

By my construction, the minnows do not come in contact with metal, the outer receptacle is provided with an air space between the outer and inner walls for keeping the water cool and by the use of a plurality of inclosed waterproofed sealed air cells of fibrous material which is more or less flexible, cheaper to manufacture and do not pollute the water, a float chamber is produced which practically eliminates the possibility of the sinking of the inner receptacle, as one air cell is sufficient to float the same.

My invention comprises generally, a minnow pail of the floating type, comprising an outer receptacle provided with a waterproofed sealed inner lining of fibrous material spaced apart therefrom, and forming an air space, a cover for said receptacle, an inner receptacle composed of waterproofed sealed fibrous material having the lower portion thereof perforated and the upper portion provided with an open ended chamber, a plurality of waterproofed sealed air cells of fibrous material in said chamber and straps for detachably securing said inner receptacle to said cover thereby inclosing said air cells.

In the drawing, 1 represents the pail or outer receptacle having the usual sides and bottom for containing the water. The pail may be of fibrous material.

2 is the inner receptacle or float chamber.

The pail or outer receptacle is here shown as provided with an inner lining 3 of fibrous material as paper, so arranged that there is an air space 4 between the walls of the outer receptacle and the water in said receptacle. This result is preferably accomplished by the use of what is known as corrugated paper composed of two sheets, one straight and one corrugated as shown at 5 and 6, Figure 5. This paper is impregnated with paraffine to make it impervious to water, and may be cemented or otherwise fixed to the outer receptacle.

7 is the cover for the outer receptacle and 8 is the inner receptacle or float chamber.

The float chamber is composed of inner and outer walls 9 and 10 of fibrous material as paper or the like impregnated with any desirable water proofing as for instance, paraffine or the like.

The outer wall 10 has its lower edge turned in as at 11 to support a bottom 12 of the same material. The bottom 12 is preferably connected to the inturned edge 11.

The lower portions of the walls 9 and 10 closely fit each other and are perforated as shown at 13.

The upper portions of said walls are preferably spaced apart thereby forming an open ended chamber 14 surrounding the upper part of said inner receptacle or float chamber 8.

15 are the floats or air cells, which may be of any size or form of construction, but are preferably formed in segments as shown in Figure 2 and are composed of paper with their joints connected or fixed together in any desirable manner then impregnated with some waterproofing material as paraffine to hermetically seal each individual cell.

As shown at 16, Figure 3, the float may consist of but a single cell.

The float chamber 8 is preferably detachably connected to the cover 7 of the outer receptacle in order that the air cells 15 may be interchanged and as here shown the cover 7 is formed with shoulders 17 and 18 with which the upper ends of the walls 9 and 10 of the inner receptacle coact.

As shown in Figure 1, when the inner receptacle is attached to the cover 7 with the walls 9 and 10 coacting with their respective shoulders 17 and 18 on the cover 7, the air cells 15 are completely inclosed and protected.

Any desirable means may be used for detachably connecting the inner receptacle 8 to the cover 7.

The means here shown comprises straps 19 fixed together at 20. The receptacle is hung on these straps 19 and the ends thereof pass through slots in the cover 7 and are bent down around the shoulder 18 as shown at 21.

What I claim is:

1. A minnow pail of the floating type comprising an outer receptacle having a cover, an inner receptacle having an open ended chamber in the upper portion thereof for containing a plurality of air cells and straps for detachably securing said inner receptacle to said cover thereby inclosing said air cells.

2. A minnow pail of the floating type comprising an outer receptacle and an inner receptacle having a plurality of air cells composed of waterproofed fibrous material removably inclosed therein.

3. A minnow pail of the floating type comprising an outer receptacle and an inner receptacle composed of waterproofed fibrous material and having the lower portion perforated and the upper portion removably inclosing a plurality of waterproofed air cells of fibrous material.

4. A minnow pail including an outer receptacle provided with a waterproofed inner lining of fibrous material spaced apart therefrom forming air spaces between said lining and said outer receptacle.

5. A minnow pail including an outer receptacle provided with an inner lining of waterproofed corrugated paper forming an air space between said outer receptacle and said inner lining.

6. A minnow pail of the floating type comprising an outer receptacle provided with a waterproofed inner lining of fibrous material spaced apart therefrom, a cover for said receptacle, an inner receptacle composed of waterproofed fibrous material having the lower portion thereof perforated and the upper portion provided with an open ended chamber, a plurality of waterproofed air cells of fibrous material in said chamber, and straps for detachably securing said inner receptacle to said cover thereby inclosing said air cells.

7. A minnow pail of the floating type comprising an outer receptacle and a cover for said receptacle, an inner receptacle of waterproofed fibrous material having inner and outer side walls, the lower portion of which closely fit each other and are perforated, and the upper portion of which are spaced apart, forming an open ended chamber for a plurality of waterproofed air cells of fibrous material, shoulders formed on said cover for coacting with the upper end of said spaced apart walls, and straps for detachably securing said inner receptacle to said cover thereby inclosing said cells.

In testimony whereof, I have hereby signed my name at Syracuse, in the county of Onondaga, and State of New York, this 6th day of September, 1927.

LUDWIG ALVINE ZOHE.